United States Patent
Bross et al.

(10) Patent No.: US 10,769,188 B2
(45) Date of Patent: Sep. 8, 2020

(54) TEXT SEARCHES ON GRAPH DATA

(71) Applicant: SAP SE, Walldorf (DE)

(72) Inventors: Jan Bross, Sandhausen (DE); Marcus Paradies, Erfurt (DE); Romans Kasperovics, Speyer (DE); Thomas Fischer, Sandhausen (DE); Markus Fath, Wiesloch (DE)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 15/946,379

(22) Filed: Apr. 5, 2018

(65) Prior Publication Data

US 2019/0311065 A1     Oct. 10, 2019

(51) Int. Cl.
*G06F 16/33* (2019.01)
*G06F 16/901* (2019.01)

(52) U.S. Cl.
CPC ...... *G06F 16/3344* (2019.01); *G06F 16/9024* (2019.01)

(58) Field of Classification Search
CPC ........ G06F 16/34; G06F 21/52; G06F 16/288; G06F 16/00; G06F 16/313; G06F 16/3344; G06Q 50/01
See application file for complete search history.

(56) References Cited

U.S. PATENT DOCUMENTS

| | | | | |
|---|---|---|---|---|
| 6,473,800 B1* | 10/2002 | Jerger | ............... | G06F 21/52 709/224 |
| 2009/0193037 A1* | 7/2009 | Yu | ............... | G06F 16/288 |
| 2011/0106819 A1* | 5/2011 | Brown | ............... | G06F 16/34 707/749 |
| 2015/0324404 A1* | 11/2015 | Glover | ............... | G06F 16/00 707/798 |
| 2017/0039183 A1* | 2/2017 | Bai | ............... | G06F 16/313 |
| 2017/0091337 A1* | 3/2017 | Patterson | ............... | G06Q 50/01 |

* cited by examiner

*Primary Examiner* — Etienne P Leroux
(74) *Attorney, Agent, or Firm* — Mintz Levin Cohn Ferris Glovsky and Popeo, P.C.

(57) ABSTRACT

A method for performing text searches on graph data stored in a database is provided. The method may include receiving, from a client, a request to perform a text search to locate a target string in the graph data stored in the database. The request may be in accordance with a declarative graph query configured to query the graph data stored in the database. The response to the request may include performing the text search to locate, in the graph data stored in the database, one or more records of strings that are exact matches, approximate matches, and/or linguistic matches for the target string. Related systems and articles of manufacture, including computer program products, are also provided.

18 Claims, 7 Drawing Sheets

TEXT SEARCHES ON GRAPH DATA

TECHNICAL FIELD

The subject matter described herein relates generally to database processing and more specifically to extended text searches on graph data stored in a database.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items.

By contrast, a relational database may store the relationships between different data items implicitly, for example, by organizing the data items into one or more database tables. Each database table may store a set of data items referred to as a relation. Furthermore, the rows of the database table may hold individual data items while the columns of the database table may hold the attributes that are present in each of the data items. Meanwhile, relationships between data items residing in different database tables may be implicitly defined by cross referencing the key that is associated with each data item in the relational database. For instance, a first database table may store the keys of data items from a second database table, thereby linking data items held in two separate database tables. Alternately and/or additionally, data items from the first database table and the second database table may be linked via a third database table storing the keys of data items from both the first database table and the second database table.

SUMMARY

Systems, methods, and articles of manufacture, including computer program products, are provided for performing text searches on graph data stored in a database. In one aspect, there is provided a system including at least one data processor and at least one memory. The at least one memory may store instructions that cause operations when executed by the at least one data processor. The operations may include: receiving, from a client, a request to perform a text search to locate a target string in graph data stored in a database, the request being in accordance with a declarative graph query configured to query the graph data stored in the database; and responding to the request by at least performing the text search to locate, in the graph data stored in the database, a record of a string that is a linguistic match for the target string, the linguistic match comprising a derivation and/or a conjugation of the target string.

In some variations, one or more features disclosed herein including the following features can optionally be included in any feasible combination. The graph data may include a first vertex and a second vertex. The graph data may further include an edge interconnecting the first vertex and the second vertex. The first vertex may correspond to a first string and the second vertex may correspond to a second string. The edge may correspond to a relationship between the first string and the second string.

In some variations, the performance of the text search may further include locating, in the graph data stored in the database, the first vertex, the second vertex, and/or the edge based at least on the first vertex, the second vertex, and/or the edge including the target string.

In some variations, the database may be a relational database that includes a vertex table and an edge table for storing the graph data. The storage of the graph data may include storing a key and/or an attribute associated with each of the first vertex, the second vertex, and/or the edge.

In some variations, the performance of the text search may further include locating, in the graph data stored in the database, a record of a string comprising an exact match for the target string. The exact match for the target string may be identical to the target string including a pattern associated with the target string as specified by one or more operators included in the target string.

In some variations, the performance of the text search may include locating, in the graph data stored in the database, a record of a string comprising an approximate match for the target string. The approximate match for the target string may include a first substring present in the target string. The approximate match may include an insertion, deletion, substitution, and/or transposition of a second substring from the target string.

In some variations, a graph algorithm may be executed based on at least a portion of a result of the text search.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A relational database may be configured to store a graph by at least storing the corresponding graph data in a vertex table and an edge table. For example, storing the graph in the relational database may include storing, in the vertex table, the vertices of the graph including, for example, the keys and the attributes associated with each vertex. Furthermore, storing the graph in the relational database may include storing, in the edge table, the edges of the graph including, for example, the keys and the attributes associated with each edge. In some example embodiments, the graph data stored in the relational database may include textual data such as, for example, documents, paragraphs, sentences, and/or the like. For example, the vertices of the graph may represent strings corresponding to words and/or portions of words (e.g., stems, roots, prefixes, suffixes, and/or the like). Meanwhile, the edges of the graph may represent one or more relationships between the strings including, for example, structural and/or grammatical relationships, word associations, and/or the like.

In some example embodiments, the relational database may support text searches for a target string in the graph data stored in the relational database. For example, the text searches may be part of a graph algorithm including, for example, shortest path, risk propagation, minimum flow, page rank, and/or the like. According to some example embodiments, the text searches may include an exact search, a fuzzy search, and/or a linguistic search for the target string. For instance, according to some example embodiments, an exact search may return, from the relational database, one or more records of strings that are identical to the target string. Meanwhile, a fuzzy search may return one or more records of strings that are approximate matches for the target strings. Alternatively and/or additionally, a linguistic search may return one or more records of strings which are derivations and/or conjugations of the target string.

Figure 1:
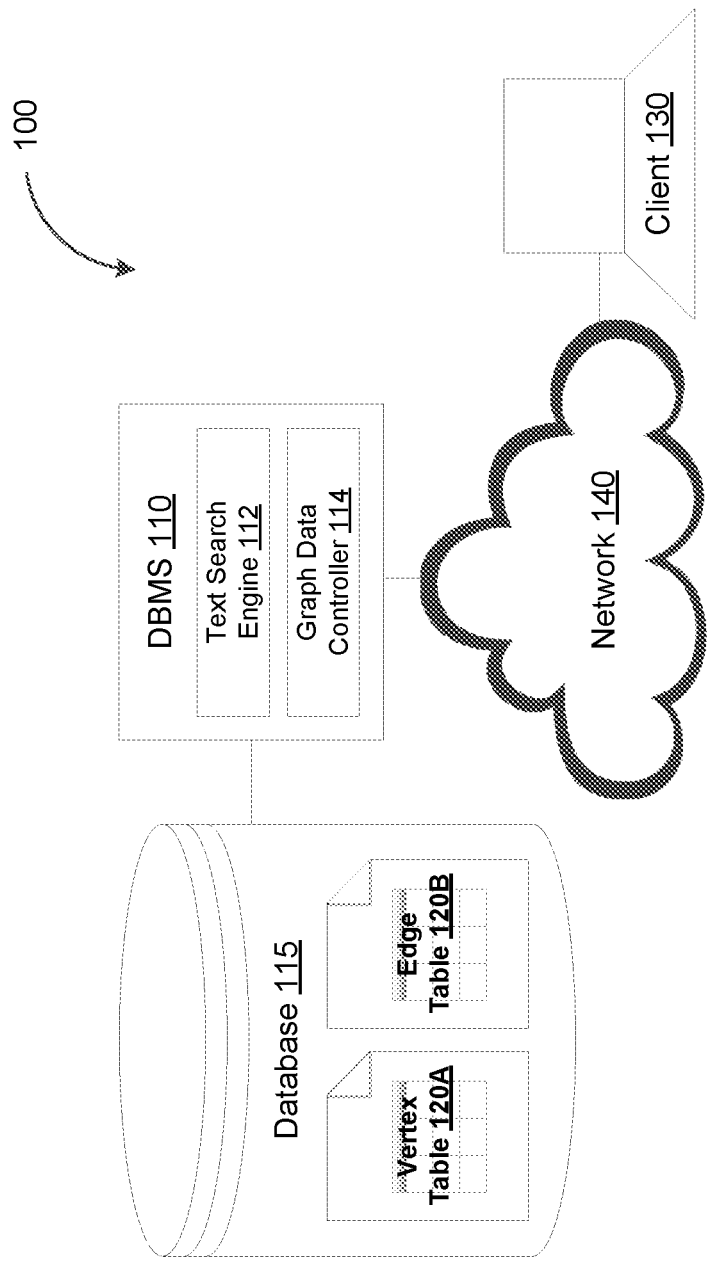
FIG. 1 depicts a system diagram illustrating a data storage system, in accordance with some example embodiments.

FIG. 1 depicts a system diagram illustrating a data storage system 100, in accordance with some example embodiments. Referring to FIG. 1, the data storage system 100 may include a database 115 storing graph data corresponding to one or more graphs. The graph data associated with a graph may include the vertices and/or the edges forming the graph. As such, in some example embodiments, the database 115 may be a relational database configured to store the graph data, for example, in a vertex table 120A and/or an edge table 120B. For example, the vertex table 120A may store the vertices of the graph including, for example, the keys and/or the attributes associated with each vertex. Meanwhile, the edge table 120B may store the edges of the graph including, for example, the keys and/or the attributes associated with each edge. It should be appreciated that the database 115 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

In some example embodiments, at least a portion of the graph data stored in the database 115 may represent textual data including, for example, documents, paragraphs, sentences, and/or the like. For example, the vertices stored in the vertex table 120A may represent strings that correspond to words and/or portions of words (e.g., stems, roots, prefixes, suffixes, and/or the like). Alternatively and/or additionally, the edges stored in the edge table 120B may represent one or more relationships between the strings, including, for example, structural and/or grammatical relationships, word associations, and/or the like. For instance, the relationship between two or more strings may include the composition of the strings into clauses, phrases, and/or words. This type of structural relationship may be governed by grammatical rules including, for example, syntax, morphology, semantics, phonetics, pragmatics, and/or the like.

Figure 2:
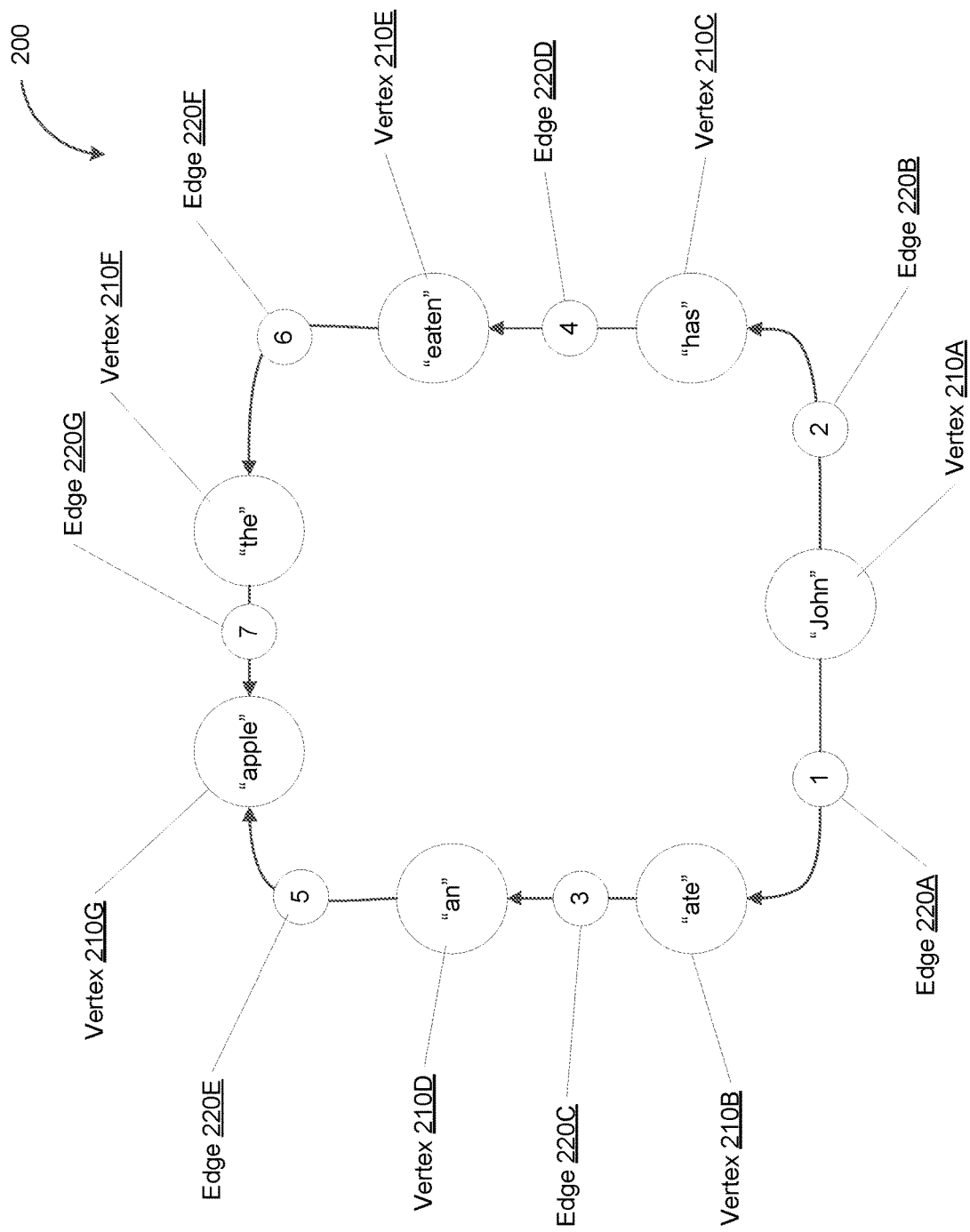
FIG. 2 depicts a graph including of textual data, in accordance with some example embodiments.

To further illustrate, FIG. 2 depicts a graph 200 representative of textual data, in accordance with some example embodiments. Referring to FIG. 2, the graph 200 may include a plurality of vertices including, for example, a first vertex 210A, a second vertex 210B, a third vertex 210C, a fourth vertex 210D, a fifth vertex 210E, a sixth vertex 210F, and/or a seventh vertex 210G. Each of the plurality of vertices may represent a string corresponding to a word and/or a portion of a word. For example, as shown in FIG. 2, the first vertex 210A may correspond to the string "John," the second vertex 210B may correspond" to the string "ate," the third vertex 210C may correspond to the string "has," the fourth vertex 210D may correspond to the string "an," the fifth vertex 210E may correspond to the string "eaten," the sixth vertex 210F may correspond to the string "the," and the seventh vertex 210G may correspond to the string "apple." In some example embodiments, graph data corresponding to the graph 200 may be stored in the database 115, for example, in the vertex table 120A and/or the edge table 120B. Accordingly, the vertex table 120A may store the first vertex 210A, the second vertex 210B, the third vertex 210C, the fourth vertex 210D, the fifth vertex 210E, the sixth vertex 210F, and/or the seventh vertex 210G by at least storing the corresponding keys and/or attributes.

Alternatively and/or additionally, the graph 200 may include a plurality edges including, for example, a first edge 220A, a second edge 220B, a third edge 220C, a fourth edge 220D, a fifth edge 220E, a sixth edge 220F, and/or a seventh edge 220G. The edge table 120B may store the first edge 220A, the second edge 220B, the third edge 220C, the fourth edge 220D, the fifth edge 22E, the sixth edge 220F, and/or the seventh edge 220G by at least storing the corresponding keys and/or attributes. In some example embodiments, the first edge 220A, the second edge 220B, the third edge 220C, the fourth edge 220D, the fifth edge 22E, the sixth edge 220F, and/or the seventh edge 220G may interconnect the first vertex 210A, the second vertex 210B, the third vertex 210C, the fourth vertex 210D, the fifth vertex 210E, the sixth vertex 210F, and/or the seventh vertex 210G, thereby indicating the structural relationship between the strings corresponding to each vertex. For example, the vertices and/or the edges of the graph 200 may represent the sentence "John has eaten the apple" as well as the sentence "John ate an apple."

Referring again to FIG. 1, the database 115 may be coupled with a database management system 110 that includes, for example, a text search engine 112 and a graph data controller 114. In some example embodiments, the database management system 110 may be configured to respond to requests from one or more clients of the data storage system 100 including, for example, a client 130. For example, as shown in FIG. 1, the client 130 may communicate with the database management system 110 via a network 140, which may be any wired and/or wireless network including, for example, a public land mobile network (PLMN), a wide area network (WAN), a local area network (LAN), a virtual local area network (VLAN), the Internet, and/or the like.

The client 130 may send, to the database management system 110, a request to perform a text search on the graph data stored in the database 115, for example, in the vertex table 120A and/or the edge table 120B. In some example embodiments, the database management system 110, for example, the text search engine 112, may respond to the request from the client 130 by performing the text search. For example, performing the text search may include locating, in at least a portion of the graph data stored in the database 115, records of strings that are exact matches, fuzzy matches, and/or linguistic matches for a target string. Alternatively and/or additionally, performing the text search may include locating, in at least a portion of the graph data stored in the database 115, the vertices and/or edges containing the target string.

As noted, the text search may be part of a graph algorithm including, for example, shortest path, risk propagation, minimum flow, page rank, and/or the like. Accordingly, the graph data controller 114 may execute the graph algorithm, for example, based on at least a portion of the result of the text search performed by the text search engine 112. It should be appreciated that a graph algorithm may refer to any algorithm that derives a solution by operating on graph data which, as noted, may include vertices interconnected by one or more directed and/or undirected edges. The graph algorithm may be a predefined graph algorithm and/or a custom graph algorithm defined by the client 130. Moreover, the graph algorithm may be defined as a stored procedure such that the database management system 110 may store, in the database 115, the executable code corresponding to the graph algorithm.

As noted, the database management system 110, for example, the text search engine 114, may be configured to perform the text search in response to the request from the client 130. In some example embodiments, the text search on the graph data stored in the database 115 may include an exact search, a fuzzy search, a linguistic search, and/or the like. For instance, the text search engine 114 may perform an exact search to locate, in the graph data stored in the database 115, one or more records of strings that are identical to a target string. Alternatively and/or additionally, the text search engine 114 may perform a fuzzy search to locate one or more records of strings that are approximate matches for a target string. The text search engine 114 may also perform a linguistic search to locate one or more records of strings that are derivations and/or conjugations of a target string.

In some example embodiments, the database management system 110 may support a declarative graph query language such as, for example, openCypher and/or the like. Accordingly, the request from the client 130 to perform the text search may be a query in the declarative graph query language. For example, the request from the client 130 may invoke a TEXT_CONTAINS function. Furthermore, the request from the client 130 may specify whether the search should be an exact search, a fuzzy search, and/or a linguistic search. To further illustrate, Table 1 below depicts examples of queries to perform an exact search.

TABLE 1

MATCH (a)–[e]–>(b)
WHERE SYS.TEXT_CONTAINS(e.color, 'b*','EXACT')
RETURN a.id

Referring to Table 1, it should be appreciated that the target string (e.g., "b*") may include a complex search pattern specified by one or more operators. For example, the operator "-" may indicate a search for strings that exclude the exact string following the "-" operator. The operator "?" may indicate a search for strings containing a single wildcard character at the location of the "?" operator while the operator "*" may indicate a search for strings containing one or more wildcard characters at the location of the "*" operator. Alternatively and/or additionally, the operator "OR" may indicate a search for a string containing at least one of the terms joined by the "OR" operator. It should be appreciated terms appearing within quotation marks " " may be treated as a single string including any spaces joining the terms. As such, an exact search for terms that appear within quotation marks may return strings that contain these terms in that exact order and joined by the same spaces. To further illustrate, Table 2 below depicts examples of exact searches for strings that include complex search patterns.

TABLE 2

SYS.TEXT_CONTAINS(a.color, 'red','EXACT')
SYS.TEXT_CONTAINS(a.color, '-red','EXACT')
SYS.TEXT_CONTAINS(a.color, 'red*','EXACT')
SYS.TEXT_CONTAINS(a.color, '?ed','EXACT')
SYS.TEXT_CONTAINS(a.color, 'red OR blue','EXACT')
SYS.TEXT_CONTAINS(a.color, 'red blue','EXACT')
SYS.TEXT_CONTAINS(a.color, '"red blue"','EXACT')

As noted, the database management system 110, for example, the text search engine 112, may perform a fuzzy search to locate, in the graph data stored in the database 115, one or more records of strings that are approximate matches for a target string. To further illustrate, Table 3 depicts a query to perform a fuzzy search.

TABLE 3

MATCH (a)
WHERE SYS.TEXT_CONTAINS(person.name, 'Philip','FUZZY(0.8)')
RETURN a.id In some example embodiments, a fuzzy search can return records of strings that are not necessarily identical to the target string. Instead, the fuzzy search can return records of strings that are approximate matches for the target string. As used herein, an approximate match for the target string may include one or more of the substrings that are present in the target string. However, the approximate match for the target string may differ from the target string due to the insertion, deletion, substitution, and/or transposition of one or more other substrings, which may be present and/or absent from the target string. For example, the fuzzy search for the target string "Philip" may return a record for the string "Phillip," which may not be an exact match for the target string "Philip" due to the presence of the additional letter "1." As shown in Table 3, the query to perform a fuzzy search can specify a fuzzy score (e.g., 0.8), which may be a value (e.g., between 0 and 1) indicating how different a string can be relative to the target string in order to be included as part of the result of the fuzzy search. For instance, according to some example embodiments, a higher fuzzy score may indicate a more exact match to the target string while a lower fuzzy score may indicate a less exact match to the target string.

Table 4 below depicts additional options for customizing a fuzzy search.

TABLE 4

| OPTIONS | VALUES | DESCRIPTION |
| --- | --- | --- |
| similarCalculationMode | typeahead, symmetricsearch, sub-stringsearch, searchcompare, search, compare | Defines the impact of wrong characters, additional characters in search pattern and additional characters in data for the fuzzy score |
| termMappingTable | unquoted sql identifier | Defines terms that are used to extend a search to generate additional results |
| stopWordTable | unquoted sql identifier | Defines terms that are less significant for a search and are therefore not used to generate results |
| abbriviationSimilarity | 0 . . . 1 | Defines the similarity that is returned for a matching initial character |
| andSymmetric | true, false | Symmetric content search for 'ABC' finds 'ABCD' and 'AB' |
| andThreshold | 0 . . . 1 | Determines the percentage of tokens that need to match |
| (de)composeWords | 1 . . . 5 | Control sensitivity regarding compound spelling |
| searchMode | alphanum, housenumber, postcode | Search for special formats |

In some example embodiments, the database management system 110, for example, the text search engine 112, may perform a linguistic search, which may return one or more records of strings that are derivations and/or conjugations of a target string. Table 5 below depicts a query to perform a linguistic search.

TABLE 5

SYS.TEXT_CONTAINS(a.attribute, 'produced','LINGUISTIC')

Referring to Table 5, the query to perform a linguistic search for the target string "produced" may return records of strings that are derivations and/or conjugations of the target string "produced" including, for example, the strings "producing," "produce," "production," "product," and/or the like. It should be appreciated that the derivations and/or conjugations of the target string may be any variation of the target string including, for example, variations that include only a portion of the target string.

Figure 3:
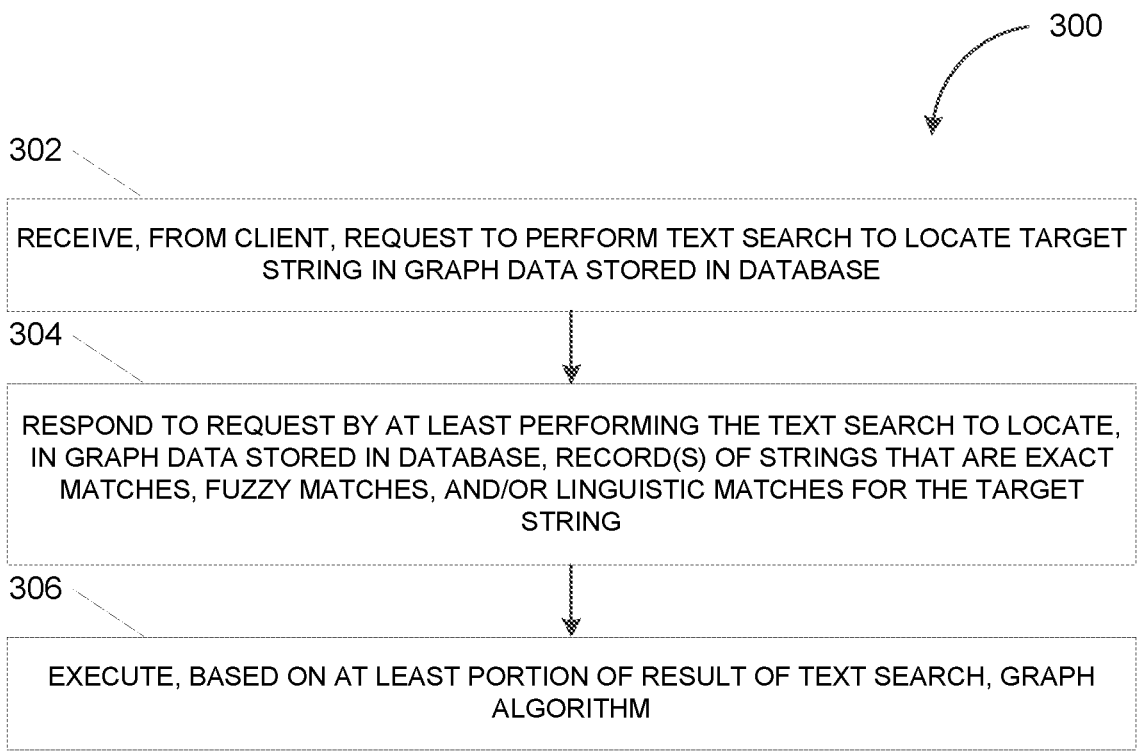
FIG. 3 depicts a flowchart illustrating a process for performing a text search on graph data, in accordance with some example embodiments.

FIG. 3 depicts a flowchart illustrating a process 300 for performing a text search on graph data, in accordance with some example embodiments. Referring to FIGS. 1-3, the process 300 may be performed by the database management system 110, for example, by the text search engine 112. In some example embodiments, the database management system 110 may perform the process 300 in order to locate, in the database 115, one or more records of strings that are exact matches, fuzzy matches, and/or linguistic matches for a target string.

At 302, the database management system 110 may receive, from the client 130, a request to perform a text search to locate a target string in the graph data stored in a database. For example, the database management system 110, for example, the text search engine 112, may receive, from the client 130, a request to perform a text search to locate a target string in the graph data stored at the database 115, for example, in the vertex table 120A and/or the edge table 120B. It should be appreciated that instead of and/or in addition to locating the target string, the database management system 110, for example, the text search engine 112, may also perform the text search to locate vertices and/or edges containing the target string.

In some example embodiments, the request from the client 130 may be in a declarative graph query language such as, for example, opehCypher and/or the like. For instance, the request from the client 130 may invoke a TEXT_CONTAINS function. Furthermore, the request from the client 130 may specify whether to perform an exact search, a fuzzy search, and/or a linguistic search for the target string.

At 304, the database management system 110 may respond to the request by at least performing the text search to locate, in the graph data stored in the database, one or more records of strings that are exact matches, fuzzy matches, and/or linguistic matches for the target string. In some example embodiments, the database management system 110, for example, the text search engine 112, may perform an exact search for the target string by at least locating, in the graph data stored at the database 115, one or more records of strings that are identical to the target string. Alternatively and/or additionally, the database management system 110 may perform a fuzzy search for the target string by at least locating, in the graph data stored at the database 115, one or more records of strings that are approximate matches for the target string. The database management system 110 may perform a linguistic search by at least locating, in the graph data stored at the database 115, one or more records of strings that are derivations and/or conjugations of the target strings.

At 306, the database management system 110 may execute, based at least on a portion of a result of the text search, a graph algorithm. In some example embodiments, the text search for the target string may be part of a graph algorithm including, for example, shortest path, risk propagation, minimum flow, page rank, and/or the like. As such, the database management system 110, for example, the graph data controller 114, may execute the graph algorithm based on at least a portion of the result of the text search which, as noted, may include records of strings that are exact matches, fuzzy matches, and/or linguistic matches for the target string.

Figure 4A:
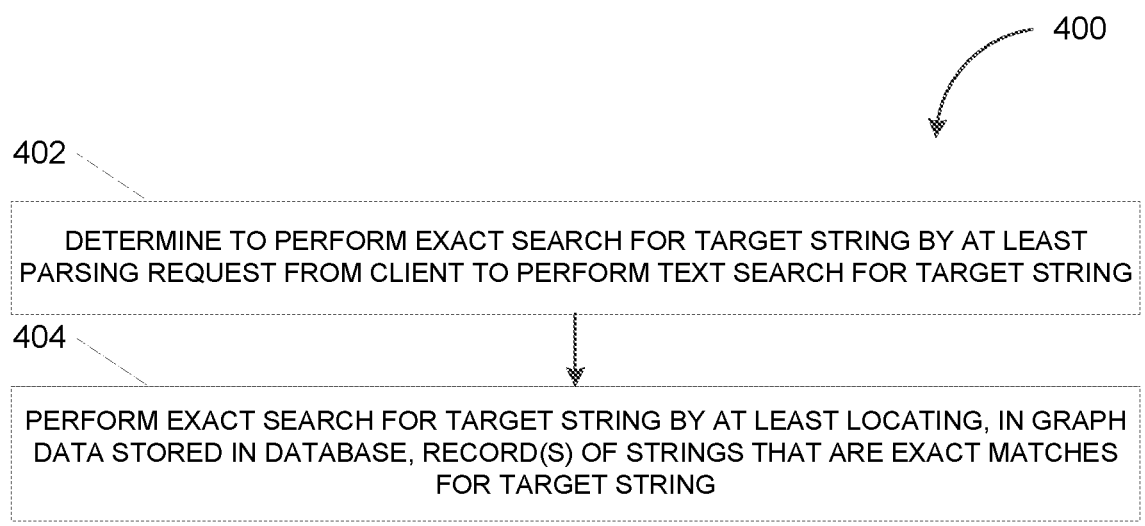
FIG. 4A depicts a flowchart illustrating a process for performing an exact text search, in accordance with some example embodiments.

FIG. 4A depicts a flowchart illustrating a process 400 for performing an exact text search, in accordance with some example embodiments. Referring to FIGS. 1-3 and 4A, the process 400 may be performed by the database management system 110, for example, by the text search engine 112. In some example embodiments, the process 400 may implement operation 304 of the process 300. For instance, the database management system 110 may perform the process 400 in order to perform an exact search for a target string.

At 402, the database management system 110 may determine to perform an exact search for a target string by at least parsing a request from the client 130 to perform a text search for the target string. As shown in Table 1, in some example embodiments, the request from the client 130 may specify an exact search. Furthermore, as Table 2 shows, the target string included in the request from the client 130 may be associated with a complex search pattern. For example, the complex search pattern may be specified by one or more operators (e.g., "–," "*," "?," "OR," and/or the like). Accordingly, the database management system 110, for example, the text search engine 112, may parse the request from the client 130 to at least determine that the text search is an exact search for a target string. The database management system 110 may further parse the request from the client 130 to determine the complex search pattern associated with the target string.

At 404, the database management system 110 may perform the exact search by at least locating, in graph data stored in a database, one or more records of strings that are exact matches for the target string. For example, in some example embodiments, the database management system 110 may perform an exact search for the target string by at least locating, in the graph data stored in the database 115, one or more records of strings that are identical to the target string including, for example, the complex search pattern associated with the target string.

Figure 4B:
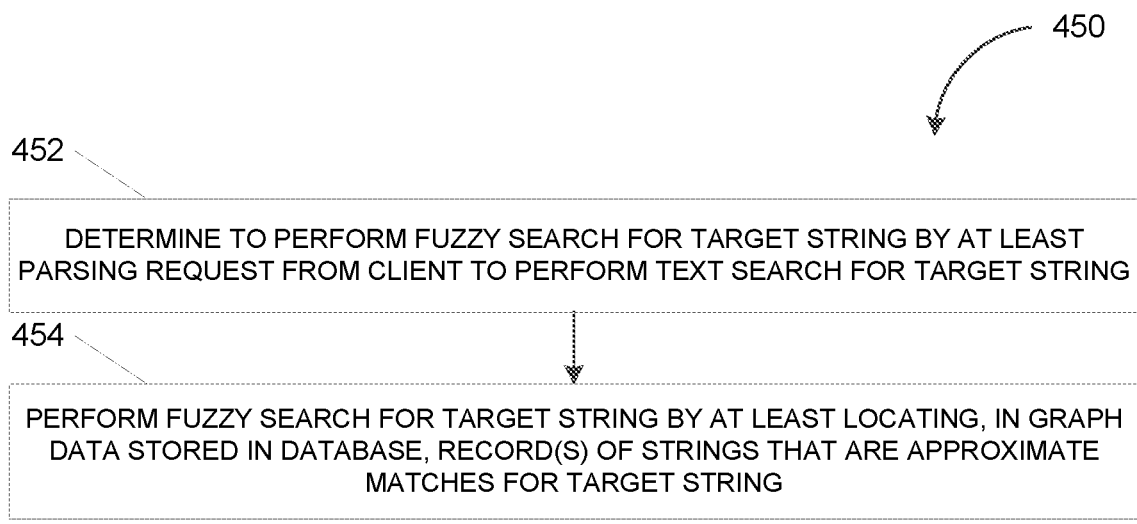
FIG. 4B depicts a flowchart illustrating a process for performing a linguistic text search, in accordance with some example embodiments.

FIG. 4B depicts a flowchart illustrating a process 450 for performing a linguistic text search, in accordance with some example embodiments. Referring to FIGS. 1-3 and 4B, the process 450 may be performed by the database management system 110, for example, by the text search engine 112. In some example embodiments, the process 450 may implement operation 304 of the process 300. For instance, the database management system 110 may perform the process 450 in order to perform a fuzzy search for a target string.

At 452, the database management system 110 may determine to perform a fuzzy search for a target string by at least parsing a request from the client 130 to perform a text search for the target string. As shown in Table 3, in some example embodiments, the request from the client 130 may specify a fuzzy search. Furthermore, as Table 3 and Table 4 show, the request from the client 130 may include one or more parameters (e.g., fuzzy score and/or the like) customizing the fuzzy search. Accordingly, the database management system 110, for example, the text search engine 112, may parse the request from the client 130 to at least determine that the text search is a fuzzy search for a target string. The database management system 110 may further parse the request from the client 130 to determine the parameters for performing the fuzzy search.

At 454, the database management system 110 may perform the fuzzy search by at least locating, in graph data stored in a database, one or more records of strings that are approximate matches for the target string. For example, in some example embodiments, the database management system 110 may perform a fuzzy search for the target string by at least locating, in the graph data stored in the database 115, one or more records of strings that are approximate matches to the target string. As noted, an approximate match for the target string may include one or more substrings that are present in the target string. However, the approximate match for the target string may differ from the target string due to the insertion, deletion, substitution, and/or transposition of one or more other substrings that are present and/or absent from the target string.

Figure 4C:
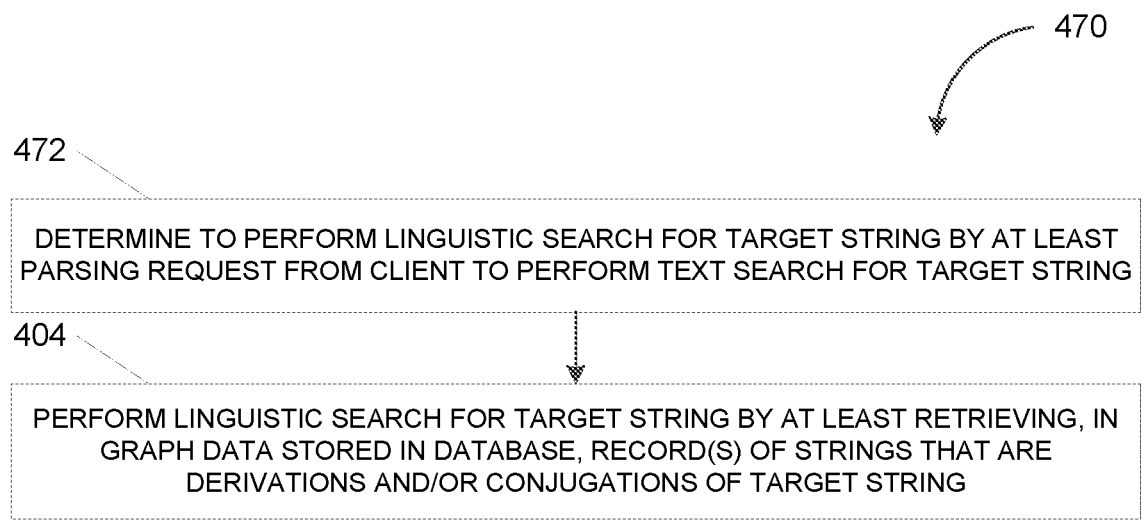
FIG. 4C depicts a flowchart illustrating a process for performing a fuzzy text search, in accordance with some example embodiments.

FIG. 4C depicts a flowchart illustrating a process 470 for performing a fuzzy text search, in accordance with some example embodiments. Referring to FIGS. 1-3 and 4C, the process 470 may be performed by the database management system 110, for example, by the text search engine 112. In some example embodiments, the process 470 may implement operation 304 of the process 300. For instance, the database management system 110 may perform the process 400 in order to perform a linguistic search for a target string.

At 472, the database management system 110 may determine to perform a linguistic search for a target string by at least parsing a request from the client 130 to perform a text search for the target string. In some example embodiments, as shown in Table 5, the request from the client 130 may specify a linguistic search. As such, the database management system 110, for example, the text search engine 112, may parse the request from the client 130 to at least determine that the text search is a linguistic search for a target string.

At 474, the database management system 110 may perform the linguistic search by at least locating, in graph data stored in a database, one or more records of strings that are derivations and/or conjugations of the target string. For example, in some example embodiments, the database management system 110 may perform a linguistic search for the target string by at least locating, in the graph data stored in the database 115, one or more records of strings that derivations and/or conjugations of the target string. As noted, these derivations and/or conjugations of the target string may be any variation of the target string including, for example, variations that include only a portion of the target string.

Figure 5:
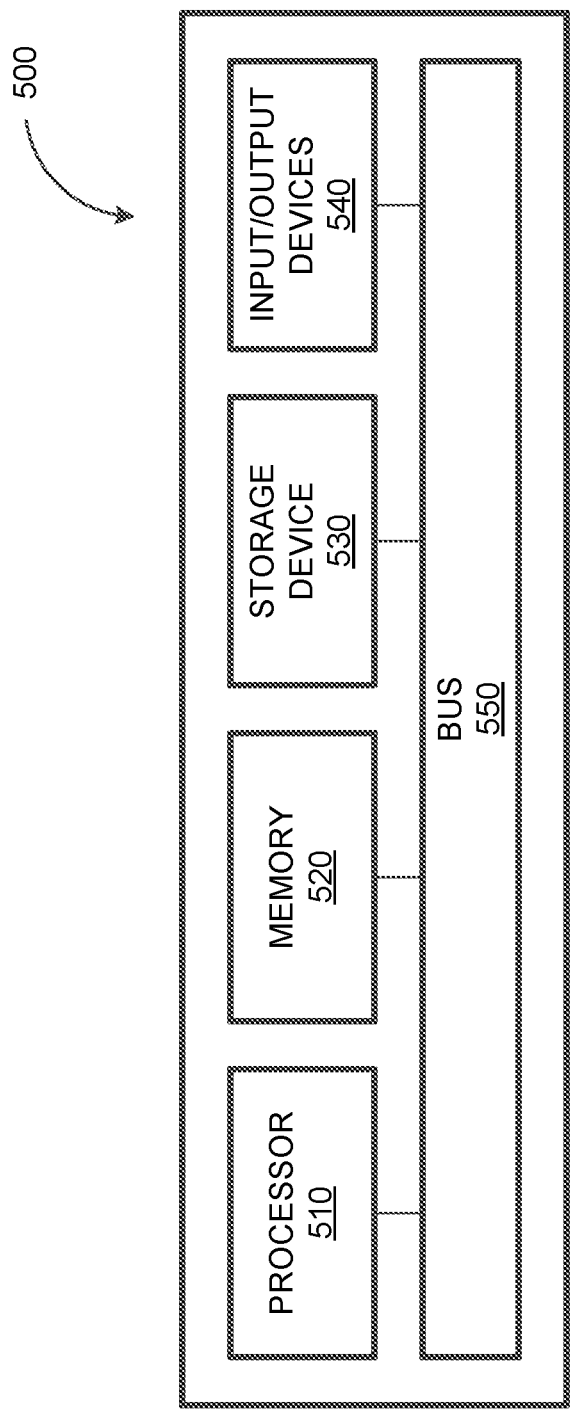
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a singlethreaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
receiving, from a client, a request to locate a target string in a graph data stored in a database, the request comprising a declarative graph query configured to query the graph data stored in the database, the graph data including a first vertex, a second vertex, and an edge interconnecting the first vertex and the second vertex, the first vertex representing a first string, the second vertex representing a second string, each of the first string and the second string corresponding to a word and/or a portion of a word, and the first string and the second string forming one or more sentences based at least in part on a structural relationship indicated by the edge interconnecting the first vertex and the second vertex; and
responding to the request by at least identifying, in the graph data stored in the database, a first record of a first sentence including a first string that is a linguistic match for the target string, the linguistic match comprising a derivation and/or a conjugation of the target string.

2. The system of claim 1, wherein the structural relationship between the first string and the second string is determined by one or more grammatical rules including a syntax, a morphology, a semantics, a phonetics, and/or a pragmatics.

3. The system of claim 1, wherein the first record is identified based at least on the derivation and/or the conjugation of the target string being part of the first sentence associated with the first record.

4. The system of claim 1, wherein the database comprises a relational database that includes a vertex table and an edge table for storing the graph data, and wherein the storage of the graph data includes storing a key and/or an attribute associated with each of the first vertex, the second vertex, and/or the edge.

5. The system of claim 1, further comprising:
responding to the request by at least identifying, in the graph data stored in the database, a second record of a second sentence including a second string that is an exact match for the target string.

6. The system of claim 5, wherein the exact match for the target string is identical to the target string including a pattern associated with the target string as specified by one or more operators included in the target string.

7. The system of claim 1, further comprising:
responding to the request by at least identifying, in the graph data stored in the database, a second record of a second sentence including a second string that is an approximate match for the target string.

8. The system of claim 7, wherein the approximate match for the target string includes a first sub string present in the target string, and wherein the approximate match may include an insertion, deletion, substitution, and/or transposition of a second substring from the target string.

9. The system of claim 1, further comprising:
executing, based on at least a portion of a result of the request, a graph algorithm.

10. A computer-implemented method, comprising:
receiving, from a client, a request to locate a target string in a graph data stored in a database, the request comprising a declarative graph query configured to query the graph data stored in the database, the graph data including a first vertex, a second vertex, and an edge interconnecting the first vertex and the second vertex, the first vertex representing a first string, the second vertex representing a second string, each of the first string and the second string corresponding to a word and/or a portion of a word, and the first string and the second string forming one or more sentences based at least in part on a structural relationship indicated by the edge interconnecting the first vertex and the second vertex; and
responding to the request by at least identifying, in the graph data stored in the database, a first record of a first sentence including a first string that is a linguistic match for the target string, the linguistic match comprising a derivation and/or a conjugation of the target string.

11. The method of claim 10, wherein the structural relationship between the first string and the second string is determined by one or more grammatical rules including a syntax a morphology, a semantics, a phonetics, and/or a pragmatics.

12. The method of claim 10, wherein the first record is identified based at least on the derivation and/or the conjugation of the target string being part of the first sentence associated with the first record.

13. The method of claim 10, wherein the database comprises a relational database that includes a vertex table and an edge table for storing the graph data, and wherein the storage of the graph data includes storing a key and/or an attribute associated with each of the first vertex, the second vertex, and/or the edge.

14. The method of claim 10, further comprising:
responding to the request by at least identifying, in the graph data stored in the database, a second record of a second sentence including a second string that is an exact match for the target string.

15. The method of claim 14, wherein the exact match for the target string is identical to the target string including a pattern associated with the target string as specified by one or more operators included in the target string.

16. The method of claim 10, further comprising:
responding to the request by at least identifying, in the graph data stored in the database, a second record of a second sentence including a second string that is an approximate match for the target string.

17. The method of claim 16, wherein the approximate match for the target string includes a first sub string present in the target string, and wherein the approximate match may include an insertion, deletion, substitution, and/or transposition of a second substring from the target string.

18. A non-transitory computer-readable medium storing instructions, which when executed by at least one data processor, result in operations comprising:

receiving, from a client, a request to locate a target string in a graph data stored in a database, the request comprising a declarative graph query configured to query the graph data stored in the database, the graph data including a first vertex, a second vertex, and an edge interconnecting the first vertex and the second vertex, the first vertex representing a first string, the second vertex representing a second string, each of the first string and the second string corresponding to a word and/or a portion of a word, and the first string and the second string forming one or more sentences based at least in part on a structural relationship indicated by the edge interconnecting the first vertex and the second vertex; and responding to the request by at least identifying, in the graph data stored in the database, a first record of a first sentence including a first string that is a linguistic match for the target string, the linguistic match comprising a derivation and/or a conjugation of the target string.

\* \* \* \* \*